United States Patent

Maeda et al.

Patent Number: 5,968,145
Date of Patent: Oct. 19, 1999

[54] SYSTEM FOR SELECTIVELY CONNECTING CPU BUS TO DMAC BUS WHEN ACCESSING DEVICE CONNECTED TO DMAC BUS IS GRANTED AND DMA CONTROLLER HAS RIGHT TO ACCESS DMAC BUS

[75] Inventors: Hiromi Maeda; Masayuki Hata, both of Tokyo, Japan

[73] Assignee: Mitsubishi Denki Kabushiki Kaisha, Tokyo, Japan

[21] Appl. No.: 08/870,414

[22] Filed: Jun. 5, 1997

[30] Foreign Application Priority Data

Jan. 23, 1997 [JP] Japan ................................. 9-010472

[51] Int. Cl.⁶ .................................................. G06F 13/28
[52] U.S. Cl. .............................. 710/28; 710/108; 710/22; 710/25
[58] Field of Search ...................... 395/845, 842, 395/877, 287; 710/1, 25, 22, 28, 57, 67, 108, 107; 364/200

[56] References Cited

U.S. PATENT DOCUMENTS

| | | | |
|---|---|---|---|
| 4,999,769 | 3/1991 | Costes et al. | 395/845 |
| 5,542,110 | 7/1996 | Minagawa | 395/287 |
| 5,566,345 | 10/1996 | Ostrowski | 395/822 |
| 5,613,162 | 3/1997 | Kabenjian | 395/842 |
| 5,805,930 | 9/1998 | Rosenthal | 395/877 |

FOREIGN PATENT DOCUMENTS

| | | |
|---|---|---|
| 2-130662 | 5/1990 | Japan . |
| 3-286241 | 12/1991 | Japan . |
| 5-225114 | 9/1993 | Japan . |

*Primary Examiner*—Thomas C. Lee
*Assistant Examiner*—Mohamed Mashaal
*Attorney, Agent, or Firm*—Burns, Doane, Swecker & Mathis, LLP

[57] ABSTRACT

A data processing unit capable of solving a conventional problem in that a CPU cannot acquire the right of using a bus as long as a DMAC (Direct Memory Access Controller) has that right, and hence the operating ratio of the CPU reduces. A CPU bus is kept disconnected from the DMAC bus as long as the CPU disables the access request to a memory connected to the DMAC bus, and is connected to a DMAC bus in response to the access request unless the DMAC has the right of using a DMAC bus.

8 Claims, 3 Drawing Sheets

SYSTEM FOR SELECTIVELY CONNECTING CPU BUS TO DMAC BUS WHEN ACCESSING DEVICE CONNECTED TO DMAC BUS IS GRANTED AND DMA CONTROLLER HAS RIGHT TO ACCESS DMAC BUS

BACKGROUND OF THE INVENTION

1. Field of the Invention

The present invention relates to a data processing unit having a data transfer function using a DMA (Direct Memory Access) controller.

2. Description of Related Art

FIG. 3 is a block diagram showing a conventional data processing unit shown on pp. 2–7 in "Mitsubishi 32-bit Single-Chip Microcomputer M16-Family/M10/10 Series User's Manual", published by Mitsubishi Denki Kabishiki Kaisha. In this figure, the reference numeral 1 designates a data processing unit, 3 designates a CPU connected to a bus 2, 4 designates an internal memory such as a ROM or RAM accessed by the CPU 3, 5 designates a DMA controller (referred to as DMAC from now on) having a data transfer function, 6 designates I/O equipment connected to the bus 2, 7 designates a storage accessed by the DMAC 5 and CPU 3, and 8 designates an external memory such as a RAM connected to the bus 2.

Next, the operation will be described.

When the CPU 3 reads a program stored in the internal memory 4 to execute it, the CPU 3 must acquire the right of using the bus 2 before accessing the internal memory 4.

Thus, the CPU 3 issues the access request to the bus 2 to acquire the right of using the bus 2.

If the DMAC 5 disables the access request as at points A, B and E in FIG. 4, and hence does not have the right of using the bus 2, the CPU 3 can acquire the right of using the bus 2 immediately. Thus, the CPU 3 places read addresses onto the bus 2 to carry out a read processing of the program from the internal memory 4.

However, if the DMAC 5 currently enables the access request and has the right of using the bus 2, the CPU 3 cannot acquire the right of using the bus 2, thereby entering a waiting state for the DMAC 5 to complete the data transfer and relinquish the right of using the bus 2.

The reason why the CPU 3 cannot acquire the right of using the bus 2 in spite of enabling the access request at the same time with the DMAC 5 is that the DMAC 5 has a higher priority to acquire the bus than the CPU 3.

Incidentally, the same reason applies to the fact that the DMAC 5 acquires the right of using the bus 2 three straight times by successively enabling the access requests (D2, D3 and D4) after having acquired the right of using the bus 2 at the point C.

After the DMAC 5 disables the access request to relinquish the right of using the bus 2 as at the point D in FIG. 4, the CPU 3 immediately acquires the right of using the bus 2.

Then, the CPU 3 places read addresses of the program onto the bus 2 to execute the read processing of the program from the internal memory 4.

With such an arrangement, the conventional data processing unit has a problem in that the CPU 3 cannot acquire the right of using the bus 2 as long as the DMAC 5 has it, thereby reducing the operating ratio of the CPU 3.

SUMMARY OF THE INVENTION

The present invention is implemented to solve the foregoing problem. It is therefore an object of the present invention is to provide a data processing unit capable of increasing the operating ratio of the CPU without giving any adverse effect on the data transfer function of the DMAC.

According to a first aspect of the present invention, when a CPU enables an access request to an internal resource connected to a DMAC bus, a CPU bus is connected to the DMAC bus unless a DMA controller has gained a right of using the DMAC bus, whereas the CPU bus is kept disconnected from the DMAC bus as long as the CPU disables the access request.

According to a second aspect of the present invention, when a CPU enables an access request to an external resource connected to a DMAC bus, a CPU bus is connected to the DMAC bus unless a DMA controller has gained a right of using the DMAC bus, whereas the CPU bus is kept disconnected from the DMAC bus as long as the CPU disables the access request.

Here, the CPU bus may be immediately connected to the DMAC bus in response to the access request of the CPU unless the DMAC controller has gained the right of using the DMAC bus, and may be connected to the DMAC bus after the DMA controller relinquishes the right of using the DMAC bus if the DMA controller has gained the right of using the DMAC bus.

An internal resource accessed by the CPU but not by the DMA controller may be connected to the CPU bus.

DETAILED DESCRIPTION OF THE PREFERRED EMBODIMENTS

The invention will now be described with reference to the accompanying drawings.

EMBODIMENT 1

Figure 1:
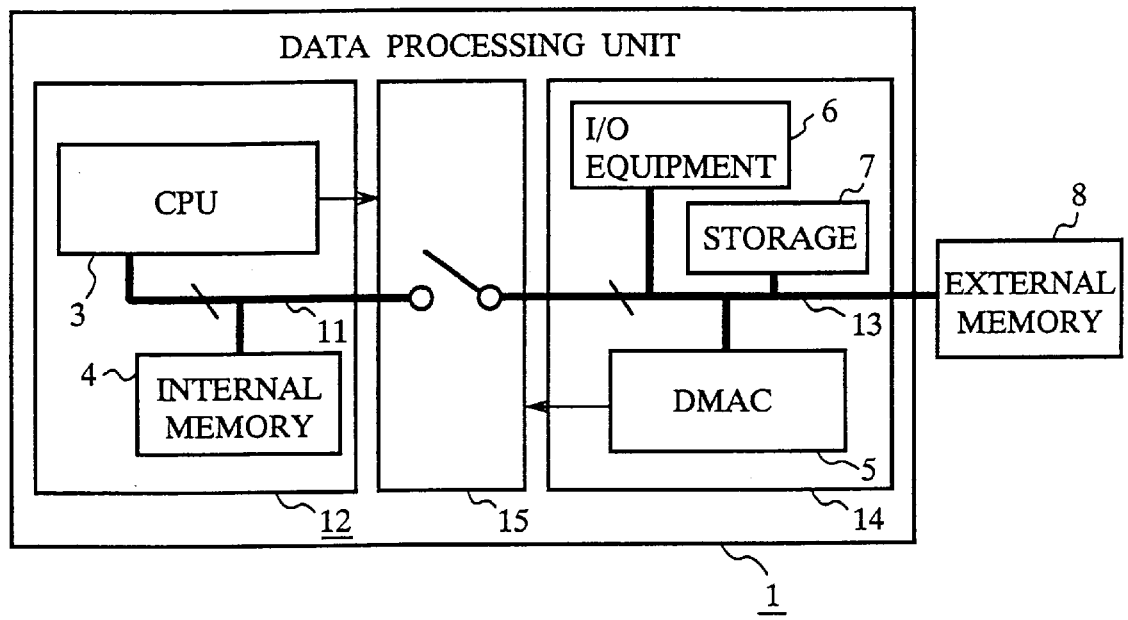
FIG. 1 is a block diagram showing an embodiment 1 of a data processing unit in accordance with the present invention.
Figure 3:
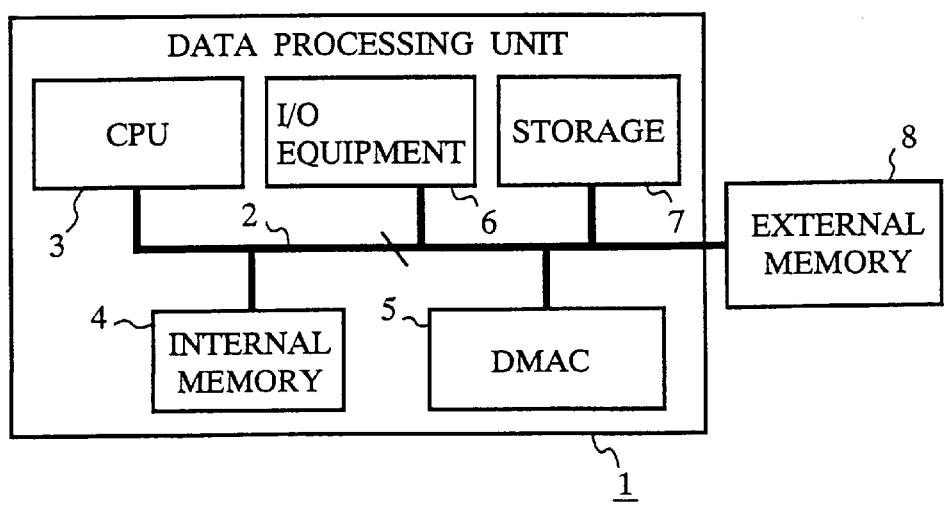
FIG. 3 is a block diagram showing a conventional data processing unit.

FIG. 1 is a block diagram showing an embodiment 1 of a data processing unit in accordance with the present invention. In this figure, the reference numeral 1 designates a data processing unit, 3 designates a CPU, 4 designates an internal memory (internal resource) such as a ROM or RAM accessed by the CPU 3, 11 designates a CPU bus to which the CPU 3 and internal memory 4 are connected, 12 designates a CPU block including the CPU 3, internal memory 4 and CPU bus 11.

The reference numeral 5 designates a DMAC (DMA Controller) having a data transfer function, 6 designates I/O equipment (internal resource), 7 designates a storage (internal resource) accessed by the DMAC 5 and CPU 3, 13 designates DMAC bus to which the DMAC 5, I/O equipment 6 and storage 7 are connected, 14 designates a DMAC block including the DMAC 5, I/O equipment 6, storage 7 and DMAC bus 13, and 8 designates an external memory (external resource) such as a RAM connected to the DMAC bus 13.

Furthermore, the reference numeral 15 designates a bus connecting means. The bus connecting means 15 immediately connects the CPU bus 11 to the DMAC bus 13 in response to the access request to the storage 7 issued from by the CPU 3, unless the DMAC 5 has the right of using the DMAC bus 13. On the other hand, the bus connecting means 15 connects the CPU bus 11 to the DMAC bus 13 after the DMAC 5 has relinquished the right of using the DMAC bus 13, if the DMAC 5 has that right in advance.

Next, the operation of the embodiment 1 will be described.

First, the data processing unit 1 is divided into three blocks as shown in FIG. 1.

The CPU block 12 of the three blocks includes, besides the CPU 3, the internal memory 4 accessed only by the CPU 3 (that is, not accessed by the DMAC 5), and the CPU bus 11 for connecting the CPU 3 to the internal memory 4.

The DMAC block 14 includes, in addition to the DMAC 5, the storage 7 accessed by the DMAC 5 and CPU 3, and the I/O equipment 6 and DMAC bus 13 which are accessed only by the DMAC 5.

The bus connecting means 15 manages the connection state of the CPU bus 11 with the DMAC bus 13, which keeps the disconnected state unless the CPU 3 enables the access request to the storage 7.

Accordingly, as long as the CPU 3 disables the access request to the storage 7, the CPU bus 11 is kept disconnected from the DMAC bus 13. This makes it possible for the CPU 3 to freely acquire the right of using the CPU bus 11, even though the DMAC 5 has the right of using the DMAC bus 13.

Thus, the CPU 3 can make an access to the internal memory 4 independently of the transfer operation of the DMAC 5. This makes it possible to solve the disadvantage of reducing the operating ratio due to the effect of the DMAC 5.

On the other hand, when the CPU 3 must access the storage 7, it supplies the bus connecting means 15 with the access request to the storage 7 because it cannot access the storage 7 if the CPU bus 11 is disconnected from the DMAC bus 13.

Figure 2:
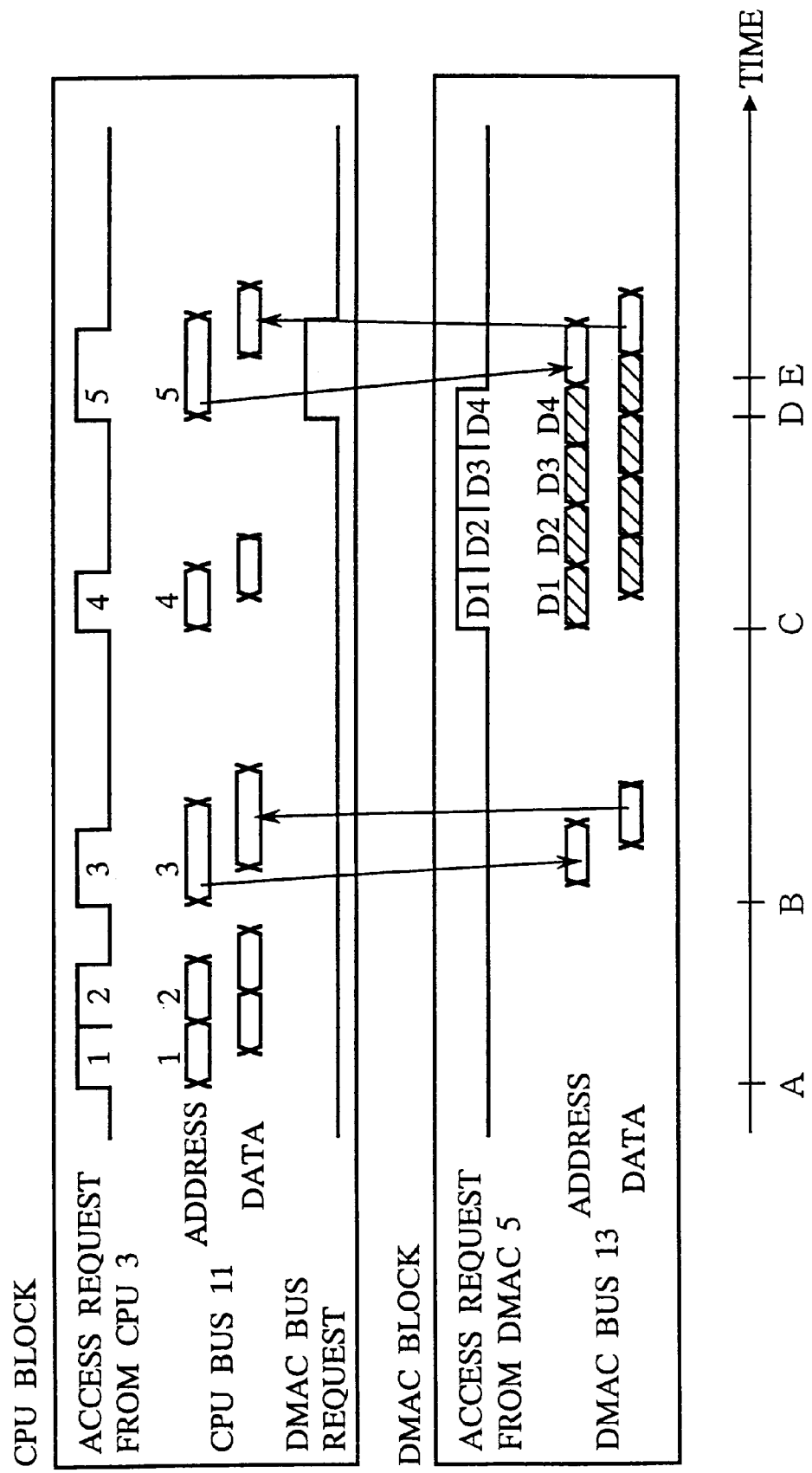
FIG. 2 is a timing chart illustrating the operation of the embodiment 1 of the data processing unit in accordance with the present invention.
Figure 4:
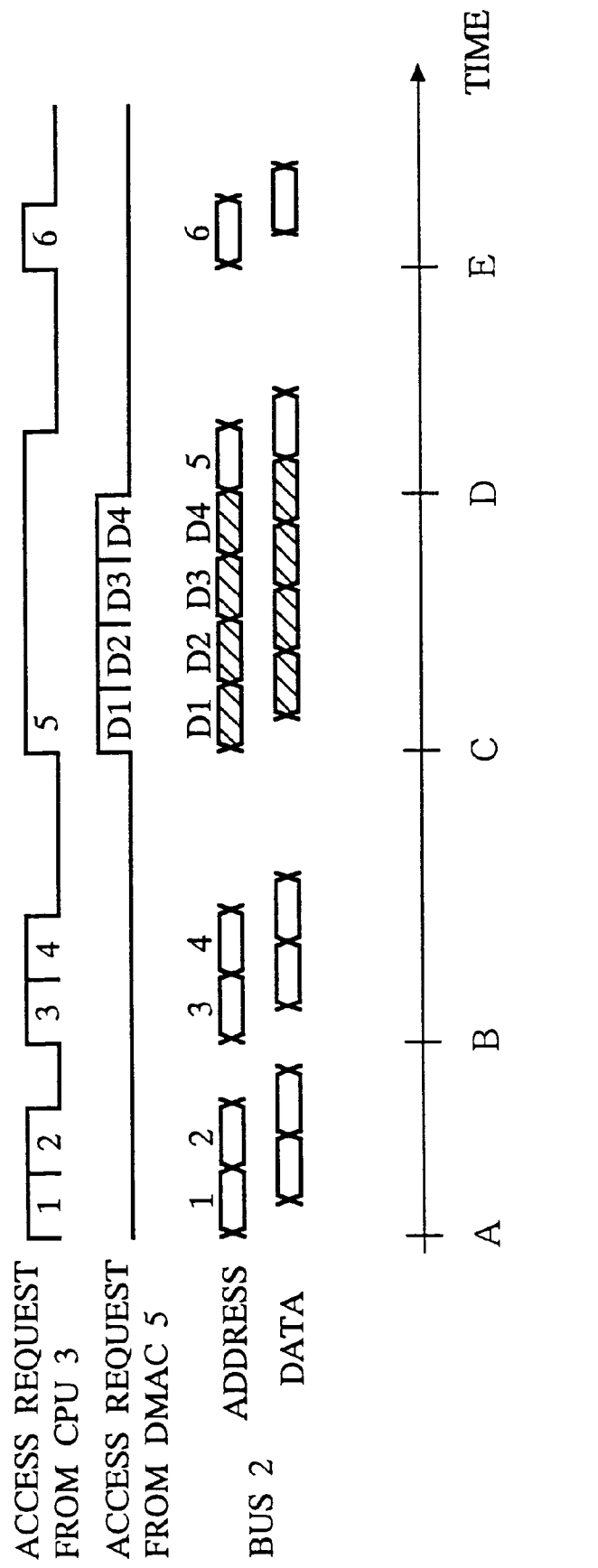
FIG. 4 is a timing chart illustrating the operation of the conventional data processing unit.

The bus connecting means 15 immediately connects the CPU bus 11 to the DMAC bus 13 in response to the access request fed from the CPU 3, unless the DMAC 5 has the right of using the DMAC bus 13 and hence it is available as at the B point in FIG. 2.

In contrast with this, if the DMAC 5 has gained the right of using the DMAC bus 13 as at the point D in FIG. 2, the bus connecting means 15 connects the CPU bus 11 to the DMAC bus 13 after the DMAC 5 has relinquished the right of using the DMAC bus 13 at the E point in FIG. 2 so as not to impair the transfer function of the DMAC 5.

Thus, the CPU 3 can access the storage 7 through the CPU bus 11 and DMAC bus 13.

According to the present embodiment 1, since the disconnected state between the CPU bus 11 and the DMAC bus 13 is maintained as long as the CPU 3 disables the access request to the storage 7 as described above, the CPU 3 can access the internal memory 4 independently of the transfer of the DMAC 5. This can solve the conventional disadvantage of reducing the operating ratio of the CPU 3 due to the effect of the DMAC 5.

Furthermore, in accordance with the present embodiment 1, since the internal resource (internal memory 4) accessed by the CPU 3 but not by the DMAC 5 is connected to the CPU bus 11, the operating ratio of the CPU 3 can be increased with an increase in the access frequency to the internal memory 4 by the CPU 3.

Moreover, according to the present embodiment 1, the access time of the CPU 3 to the storage 7 can be minimized without impairing the transfer function the DMAC 5. This is because the connection of the CPU bus 11 to the DMAC bus 13 is immediately carried out in response to the access request to the storage 7 from the CPU 3 unless the DMAC 5 has the right of using the DMAC bus 13, whereas it is carried out only after the DMAC 5 relinquishes the right when the DMAC 5 has gained it in advance.

EMBODIMENT 2

Although the CPU 3 makes an access to the internal resource connected to the DMAC bus 13, that is, to the storage 7 in the embodiment 1, it can also make an access to the external resource connected to the DMAC bus 13, that is, to the external memory 8. This offers an advantage similar to those of the embodiment 1.

What is claimed is:

1. A data processing unit comprising:
    a CPU (Central Processing Unit);
    a CPU bus to which an internal resource accessed by said CPU is connected;
    a DMA (Direct Memory Access) controller;
    a DMAC (Direct Memory Access Controller) bus to which an internal resource accessed by said DMA controller is connected; and
    bus connecting means for connecting, when said CPU enables an access request to said internal resource connected to said DMAC bus, said CPU bus to said DMAC bus unless said DMA controller has a right of using said DMAC bus, said bus connecting means keeping a disconnected state between said CPU bus and said DMAC bus as long as said CPU disables the access request.

2. The data processing unit as claimed in claim 1, wherein said bus connecting means immediately connects said CPU bus to said DMAC bus in response to the access request of said CPU unless said DMAC controller has gained the right of using said DMAC bus, and connects said CPU bus to said DMAC bus after said DMA controller relinquishes the right of using said DMAC bus if said DMA controller has gained the right of using said DMAC bus.

3. The data processing unit as claimed in claim 1, wherein an internal resource accessed by said CPU but not accessed by said DMA controller is connected to said CPU bus.

4. The data processing unit as claimed in claim 2, wherein an internal resource accessed by said CPU but not accessed by said DMA controller is connected to said CPU bus.

5. A data processing unit comprising:
    a CPU (Central Processing Unit);
    a CPU bus to which an internal resource accessed by said CPU is connected;
    a DMA (Direct Memory Access) controller;
    a DMAC (Direct Memory Access Controller) bus to which an external resource accessed by said DMA controller is connected; and
    bus connecting means for connecting, when said CPU enables an access request to said external resource connected to said DMAC bus, said CPU bus to said DMAC bus unless said DMA controller has a right of using said DMAC bus, said bus connecting means keeping a disconnected state between said CPU bus and said DMAC bus as long as said CPU disables the access request.

6. The data processing unit as claimed in claim 5, wherein said bus connecting means immediately connects said CPU bus to said DMAC bus in response to the access request of said CPU unless said DMAC controller has gained the right of using said DMAC bus, and connects said CPU bus to said DMAC bus after said DMA controller relinquishes the right of using said DMAC bus if said DMA controller has gained the right of using said DMAC bus.

7. The data processing unit as claimed in claim 5, wherein an internal resource accessed by said CPU but not accessed by said DMA controller is connected to said CPU bus.

8. The data processing unit as claimed in claim 6, wherein an internal resource accessed by said CPU but not accessed by said DMA controller is connected to said CPU bus.

* * * * *